H. H. JOHNSTON.
CONTROL APPARATUS.
APPLICATION FILED MAR. 7, 1919.
1,365,325.
Patented Jan. 11, 1921.
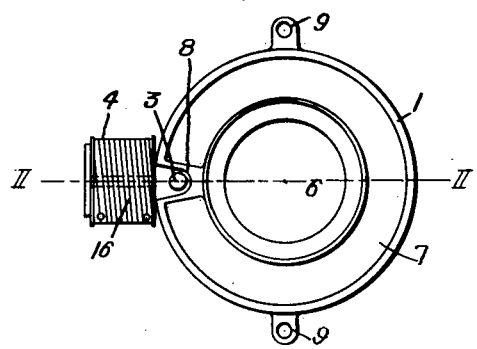
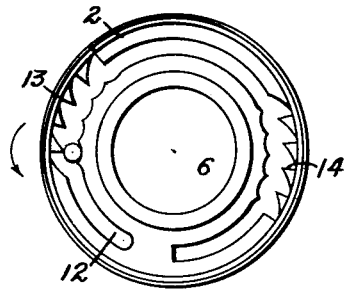
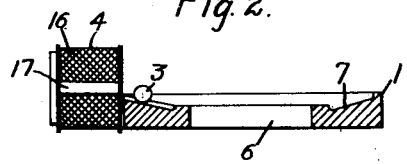
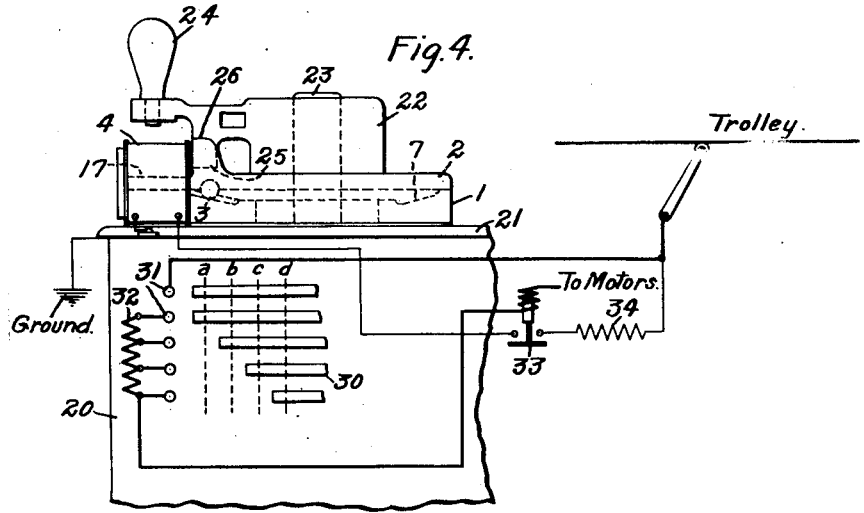
WITNESSES:
J. A. Helsel
W. R. Coley
INVENTOR
Howard H. Johnston.
BY
Merley G. Carr
ATTORNEY

UNITED STATES PATENT OFFICE.

HOWARD H. JOHNSTON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,365,325.   Specification of Letters Patent.   Patented Jan. 11, 1921.

Application filed March 7, 1919. Serial No. 281,148.

*To all whom it may concern:*

Be it known that I, HOWARD H. JOHNSTON, a citizen of the United States, and a resident of Edgewood Park, in the county of Allegheny and State of Pennsylvania, have invented a new and useful Improvement in Control Apparatus, of which the following is a specification.

My invention relates to control apparatus, and it has special reference to checking devices for preventing a relatively rapid movement of a drum controller, or the like.

One object of my invention is to provide an apparatus of the above-indicated character, whereby manual movement of the controller handle may be mechanically checked to prevent an unduly rapid rate of actuation and, in addition, an electrical checking action is also provided when the current in the apparatus to be controlled attains a predetermined value.

More specifically stated, it is the object of my invention to provide a checking device comprising a ball of magnetizable material which is acted upon by a stationary and a movable ball-race member to effect a wedging action when the controller is moved too rapidly, while the ball is magnetized and caused to assume a similar movement-restraining position under predetermined conditions of the electrical circuit.

My invention may best be understood by reference to the accompanying drawings, wherein—

Figure 1 is a plan view of one portion of a checking device constructed in accordance with my present invention.

Fig. 2 is a sectional view taken along the line II—II of Fig. 1.

Fig. 3 is a bottom plan view of the remaining member of the checking device, and Fig. 4 is a view, partially in elevation and partially diagrammatic, of a controller and a simplified control system organized in accordance with the present invention.

Referring to the drawing, the apparatus shown comprises a base or lower ball-race member 1, of brass or other non-magnetizable material; a coöperating cap or upper ball-race member 2 of similar material; a ball or sphere 3 of magnetizable material for coacting with the two ball-race members in a manner to be described; and an electromagnet 4 for the purpose of attracting the ball 3, under conditions to be set forth.

The stationary base or lower ball-race member 1 is provided with a central opening 6 and a shallow groove or race 7, of uniform cross-section throughout, that slopes laterally, or downwardly toward the center of the member, and extends around the entire circumference thereof except for a small portion that is located directly opposite the electromagnet 4. This portion is provided with a small recess or slot 8 for the purpose of initially holding the ball 3, that is, when the control apparatus to be governed occupies its normal position. For the purpose of rigidly positioning the base 1, a plurality of apertured lugs 9 are provided, whereby the base may be suitably secured to the top cover member of a controller, as shown in Fig. 4.

The movable cap or upper ball-race member 2 is likewise provided with a relatively large central opening 6, and the annular portion of the member has a groove or ball-race 12 of a slightly greater diameter than that of the ball 3, which groove occupies almost the entire annular section of the member. The groove 12 is provided, in selected portions, with a plurality of sets of lateral notches or V-shaped recesses 13 and 14. These notches correspond to the positions of a drum controller, or the like, that is to be governed by the checking device and may be placed wherever desired, whereby the checking action upon the controller movement is provided during certain selected stages of the controller operation. Thus, by varying the location of the notches 13 or 14, the checking device action may be dispensed with during certain of the operations of the motors or other apparatus to be controlled, as desired.

The electromagnet 4 comprises a coil 16 that is wound upon a magnetizable core 17, the location of parts being such that, when the coil is placed on its side, as illustrated, the lowermost surface thereof is substantially flush with the lower surface of the base 1, while the magnetizable core 17 is located substantially opposite the uppermost surface of the base member, whereby the ball 3 is attracted toward the outer edge of the inclined groove 7 to make contact with the inner end of the core 17 when the magnet coil 16 is sufficiently energized.

Referring particularly to Fig. 4, the additional apparatus shown comprises a controller of a familiar type having an outer casing 20 and a top cover member 21 to which the lower ball-race member 1 is suitably secured, and an operating handle having an apertured boss 22 for engaging the square head 23 of the controller shaft, the customary grip 24 being provided near the other end of the operating handle.

The familiar downwardly-extending lug or prong 25 of the operating handle, which ordinarily engages a stop member upon the controller cover, is located, in the present case, in a slot or recess of an upwardly-extending lug 26 forming a portion of the upper ball-race member 2. Consequently, movement of the operating handle to rotate the controller shaft 23 likewise actuates the upper ball-race member 2 over the lower member 1.

The illustrated electrical circuits are of the simplest possible nature that will point out the features and purposes of the present invention and comprise a contact segment 30 for successively engaging a plurality of control fingers 31 of the controller to gradually short-circuit a resistor 32, in accordance with a familiar practice. A current relay 33 has its actuating coil connected in circuit with the accelerating resistor 32 and with the motors or other electrical apparatus to be controlled, as indicated by the legend "To motors." The customary supply circuit, including conductors Trolley and Ground, is also shown, together with an auxiliary resistor 34, which is connected in series relation with the contact disk of the current relay 33 and the coil 16 of the electromagnet 4.

The operation of the illustrated electrical circuits may be briefly set forth as follows. When the controller is moved to its first operative position a, a circuit is established from the trolley through the control fingers 31 and contact segment 30 of the controller, accelerating resistor 32 and the actuating coil of the current relay 33 to the motors to be controlled, while further step-by-step movement of the controller gradually short-circuits the resistor 32. If, at any time, the current supplied to the motors exceeds a predetermined value, then the current relay 33 is actuated to its upper position to close an auxiliary circuit from the trolley through resistor 34, the contact disk of the current relay, the coil 16 of the electromagnet 4 and thence to the negative supply-circuit conductor Ground. Under these conditions, the electromagnet 4 attracts the magnetizable ball 3 into one of the notches 13 or 14 of the cap member 2 to make contact with the core 17 for the purpose of wedging the ball between the upper and the lower non-magnetizable ball-race members 2 and 1, respectively, to thus restrain movement of the controller in a similar manner to the mechanical checking action that is about to be described. Free movement of the ball 3 is permitted, since the ball-race members are composed of non-magnetizable material.

The normal or initial relative positions of the upper and the lower ball-race members are indicated in Figs. 1 and 3 by the positions of the solid and the dotted circles, respectively, representing the ball 3. When the controller handle is actuated in a direction corresponding to the curved arrow of Fig. 3, continuous movement of the controller is permitted so long as the operator does not attempt too rapid actuation, since the ball 3 moves freely along the ball-races 7 and 12 without lodging in the notches 13, thus allowing unimpeded passage of the cap 2 over the base 1. However, if he attempts to throw the controller into any position at such a rate of speed that an unduly heavy current, accompanied by a relatively high rate of acceleration, is produced, then the contour of the race 12, together with the inertia of the ball 3, causes it to roll or lodge in one of the notches 13, whereby a wedging action between the upper and the lower ball-race members is effected to temporarily restrain movement of the controller until the ball 3 has rolled back to its lowermost position in the ball-race 7.

In this way, a mechanical check is placed upon unduly rapid movement of the controller handle, while, as previously described, the electromagnet 4 independently acts upon the magnetizable ball 3 to likewise cause it to assume a movement-restraining position whenever the current in the motors or other apparatus being controlled exceeds a predetermined value. Consequently, although, under normal conditions, the mechanical checking device acts independently of the electrical circuits, under abnormal conditions, represented by an unduly high current in the controlled circuits, the electrical checking apparatus comes into effect whether or not the mechanical restraining device is active at the time.

It should be noted that the checking device, as illustrated, may be readily applied to standard controllers with a minimum degree of alteration and thus an inexpensive, durable and reliable checking device, combining both a mechanical and an electrical check, is provided by my invention. However, if desired, the electromagnet 4 may readily be placed inside of the controller casing, and a suitable curved iron core may then be brought through the cover member 21 of the controller and located in the same general position as the present core 17. Furthermore, if so desired, the entire checking device may be located within the controller casing, in which case the movable ball-race member 2 may be operated by a dog, or the equivalent, that is fastened to the controller shaft 23.

I do not wish to be restricted to the specific structural details or arrangement of parts herein set forth, as various modifications thereof may be made without departing from the spirit and scope of my invention. I desire, therefore, that only such limitations shall be imposed thereupon as are indicated in the appended claims.

I claim as my invention:

1. The combination with a movable control member, of single means actuated mechanically or electrically under different conditions for checking movement of said member.

2. The combination with a movable control member, of a single magnetizable member, means including said magnetizable member for mechanically preventing relatively rapid movement of the control member, and electrical means responsive to predetermined conditions for magnetizing said magnetizable member to restrain movement of said control member.

3. The combination with a movable control member, of a ball of magnetizable material, coöperating stationary and movable ball-race members for effecting a wedging action of said ball when the control member is actuated at a relatively high speed to arrest the actuation thereof, and a magnet responsive to predetermined conditions for holding said ball in a movement-restraining position.

4. The combination with a movable control member, of a ball of magnetizable material, coöperating stationary and movable ball-race members, and a magnet responsive to predetermined conditions for actuating said ball to a movement-restraining position.

5. The combination with a movable control member, of a ball of magnetizable material, coöperating stationary and movable ball-race members of non-magnetizable material, and means for magnetically wedging said ball between said ball-race members.

6. The combination with a movable control member, of a stationary base having a ball-race with a laterally inclined surface, a coöperating movable cap having a ball-race with a lateral notch, a ball disposed in said races to wedge in said notch and prevent further travel of said control member upon a relatively rapid movement thereof, and means for magnetically wedging said ball between said ball-races.

7. The combination with a movable control member, of a stationary base of non-magnetizable material having a ball-race with a laterally inclined surface, a coöperating movable cap of non-magnetizable material having a ball-race with a plurality of lateral notches, a ball of magnetizable material disposed in said races, and means for magnetically wedging said ball in one of said notches to prevent further movement of said control member.

8. The combination with a movable control member, of a stationary base of non-magnetizable material having a ball-race with a laterally inclined surface, a coöperating movable cap of non-magnetizable material having a ball-race with a plurality of lateral notches, a ball of magnetizable material disposed in said races to wedge in said notch and prevent further travel of said control member upon a relatively rapid movement thereof, and a coil responsive to predetermined conditions for magnetically attracting said ball into one of said notches.

9. The combination with a movable control member, of a single magnetizable member, means including said magnetizable member for mechanically preventing relatively rapid movement of said control member, a circuit to be governed by the control member, and means responsive to current conditions in said circuit for magnetizing said magnetizable member to restrain movement of said control member.

10. The combination with a movable control member, of a ball of magnetizable material, coöperating stationary and movable ball-race members, a circuit to be governed by said control member, and a magnet energized upon the attainment of predetermined current conditions in said circuit for actuating said ball to a movement-restraining position.

11. The combination with a movable control member, of a stationary base of non-magnetizable material having a ball-race with a laterally inclined surface, a coöperating movable cap of non-magnetizable material having a ball-race with a plurality of lateral notches, a ball of magnetizable material disposed in said races, a circuit to be governed by said control member, a relay energized in accordance with the current in said circuit, and means dependent upon the closed condition of said relay for magnetically wedging said ball in one of said notches to prevent further movement of said control member.

12. The combination with a movable control member, of a stationary base of non-magnetizable material having a ball-race with a laterally inclined surface, a coöperating movable cap of non-magnetizable material having a ball-race with a plurality of lateral notches, a ball of magnetizable material disposed in said races to wedge in said notch and prevent further travel of said control member upon a relatively rapid movement thereof, a circuit to be governed by said control member, a relay energized in accordance with the current in said circuit, and a coil dependent upon the high-current operation of said relay for magnetically attracting said ball into one of said notches.

In testimony whereof, I have hereunto subscribed my name this 20th day of February, 1919.

HOWARD H. JOHNSTON.